METHOD AND APPARATUS FOR HANDLING AND STORING BINARY DATA

Filed Dec. 30, 1954 6 Sheets-Sheet 1

*INVENTOR.*
GENUNG L. CLAPPER
*BY* P. E. Henninger
ATTORNEY

Jan. 24, 1961 G. L. CLAPPER 2,969,526

METHOD AND APPARATUS FOR HANDLING AND STORING BINARY DATA

Filed Dec. 30, 1954 6 Sheets-Sheet 2

INVENTOR.
GENUNG L. CLAPPER

BY

P. E. Henninger

ATTORNEY

METHOD AND APPARATUS FOR HANDLING AND STORING BINARY DATA

Filed Dec. 30, 1954 6 Sheets-Sheet 3

INVENTOR.
GENUNG L. CLAPPER
BY P. E. Henninger
ATTORNEY

Jan. 24, 1961 G. L. CLAPPER 2,969,526

METHOD AND APPARATUS FOR HANDLING AND STORING BINARY DATA

Filed Dec. 30, 1954 6 Sheets-Sheet 4

INVENTOR.
GENUNG L. CLAPPER
BY P. E. Henninger
ATTORNEY

INVENTOR.
GENUNG L. CLAPPER
BY P. E. Henninger
ATTORNEY

METHOD AND APPARATUS FOR HANDLING AND STORING BINARY DATA

Filed Dec. 30, 1954 6 Sheets-Sheet 6

INVENTOR.
GENUNG L. CLAPPER
BY
P. E. Henninger
ATTORNEY

United States Patent Office 2,969,526

Patented Jan. 24, 1961

2,969,526

METHOD AND APPARATUS FOR HANDLING AND STORING BINARY DATA

Genung L. Clapper, Vestal, N.Y., assignor to International Business Machines Corporation, New York, N.Y., a corporation of New York Filed Dec. 30, 1954, Ser. No. 478,628

11 Claims. (Cl. 340—174.1)

This invention relates to methods and apparatus for handling and storing binary data and particularly to electrical and magnetic methods and apparatus for that purpose.

When numerical or other data is handled or stored according to the binary system, it is broken up into units, commonly referred to as "bits." Each bit is represented by a physical condition shiftable between two values, respectively termed the "0" and the "1" values. Present high speed electrical computers handle and store data almost exclusively according to the binary system. The most common method of handling binary data in such computers has been a method sometimes termed the discrete pulse system. In that system, binary data is entered by shifting an electrical or magnetic condition, which may, for example, be a current, a potential, or the magnetic field along a storage track, between two values at separated fixed intervals, termed the synchronizing intervals. In order to read the data the condition in question is sampled or checked at similar separated intervals. To indicate a binary "0," the condition in question is maintained at a predetermined value, referred to as the "no signal" value, throughout the synchronizing interval. To indicate a binary "1," a half-wave pulse is used at the synchronizing interval. This half-wave pulse is commonly a square wave, comprising a leading wave front, a steady portion having a "signal" value distinctly differing from the "no signal" value, and a trailing wave front. The leading wave front may be positive going and the trailing wave front negative going, or vice versa. When using the discrete pulse system, some of the instrumentalities which handle the waves may respond to the complete half-wave, and other instrumentalities may respond only to the leading wave front or the trailing wave front. In the latter case, it is necessary that each such instrumentality be capable of distinguishing between the leading and trailing wave fronts, in order to avoid errors in the handling of the data. In any such arrangement, the critical time in any synchronizing interval is the almost instantaneous time of the passage of one of the wave fronts. The synchronizing intervals are commonly defined by a series of separated half-wave potential pulses from a fixed frequency half-wave generator. The potential from this generator has a "signal" value during a pulse and a "no-signal" value between pulses. In the discrete pulse system, both the synchronizing pulse and the binary data indicating condition return to zero or no-signal values between synchronizing intervals.

A more recent method of handling such data is known as the "non-return to zero" (NRZI) system. In that system, a binary "0" is indicated by maintaining the electrical or magnetic binary data-indicating condition constant at either of two values throughout one period of the synchronizing frequency, i.e. from the beginning of one synchronizing pulse to the beginning of the next. A binary "1" is indicated by shifting the condition between the two values during the synchronizing interval.

This system has been particularly useful in the magnetic storage of data, in which case the two values are magnetic fields of opposite polarities. A binary "1" magnetically stored by that system is easily converted to a discrete pulse when the stored data is being read. Each shift of polarity in the magnetic field along a storage track produces a pulse in a pick-up coil which may be readily amplified and shaped to form a square wave discrete pulse. Also, a binary "0" stored by that system presents no pulse in the reading coil. The NRZI system presents difficulties which have prevented its expansion to other parts of high speed electrical computers than the magnetic storage devices. The greatest of those difficulties is that the critical portion of the checking interval is again a very small instant of time. Furthermore, magnetic records made with the NRZI system cannot be written over without erasing. Furthermore, they cannot be edited by the insertion or removal of portions of the record, since it is practically impossible to tell in any particular case, whether an insertion will produce an extra binary "1" at its beginning and end.

An object of the present invention is to provide an improved system for handling binary data electrically.

Another object is to provide an improved system for storing binary data magnetically.

A further object is to provide a bipolar system of the type described.

Another object is to provide improved apparatus for writing on a magnetic record surface using the improved system.

Another object is to provide improved apparatus for reading a magnetic record which has been written in accordance with the improved system.

Another object is to provide apparatus for converting data stored in accordance with the discrete pulse system to the said bipolar system.

Another object is to provide apparatus for converting binary data from the bipolar system to the discrete pulse system. Another object is to provide a method and apparatus for the handling and storing of binary data wherein the critical time of reading or transmitting a binary bit is a finite time characterized by the establishment of a steady electrical or magnetic state, as opposed to an instantaneous interval characterized by transient electrical or magnetic phenomena.

Another object is to provide improved magnetic data storage apparatus including a rotatable drum having a plurality of storage tracks on its surface, and improved means for selecting the track or tracks to be read or written during a particular revolution of the drum.

The foregoing objects are attained in the methods and apparatus described herein, by providing a bipolar system wherein one polarity of a magnetic or electrical condition indicates one binary value, and the opposite polarity indicates the opposite binary value. Furthermore, the data is not handled in the present system by the use of the discrete pulses. For example, if a value is to remain at binary "1" through three successive synchronizing intervals, then it remains steadily at its binary "1" polarity throughout the full periods of the synchronizing frequency. When used for handling data electrically, the current or potential is maintained at one polarity, for example, positive, to indicate a binary "1," and at an opposite polarity to indicate a binary "0." Similarly, when storing data magnetically, a positive magnetic field indicates a binary "1" and a negative magnetic field indicates a binary "0."

The bipolar binary data is written on a magnetic drum by means of a novel writing amplifier circuit including a double inverter stage into which the bipolar binary electrical signals are fed and having complementary outputs, a double ended trigger stage having inputs connected to said complementary outputs, and a push-pull stage for driving the coil of a writing head and comprising a cathode follower and a plate driver connected in series and having their respective inputs connected to the two outputs of the trigger stage. Where the electrical data is supplied according to the discrete pulse system, a novel converter circuit is used in place of the double inverter stage, to convert the discrete pulse data into bipolar data.

Bipolar binary data stored on a magnetic drum is read from the drum by means of a reading coil, a pre-amplifier of two stages, and an amplifier including a quadrature amplifier stage which converts the peaks and slopes of the waves picked up by the reading coil into steep slopes and flat peaks, respectively, and an output stage comprising a trigger in which the wave shaping process is completed.

A circuit is described for converting the bipolar output of the reading amplifier into discrete pulse data, where that is desired.

The magnetic drum illustrated has a plurality of storage tracks, which are divided into two groups, referred to as the odd and even groups. Selection of a particular track or tracks to be written or read is made synchronously with the rotation of the drum, and shifts on alternate revolutions between the odd and even groups. During a revolution when an odd track, for example, is being read, a preselection of an even track to be read during the next revolution is being made, so that when the odd track has been read, an instantaneous shift may be made to the preselected even track. In this way, the tracks may be read in a predetermined sequence, during a number of revolutions equal to the number of tracks to be read.

A reading coil and a reading pre-amplifier are provided for each storage track. Several pre-amplifiers have their outputs connected to a single amplifier. All the pre-amplifiers are normally clamped off, and one storage track is selected by releasing the clamp on its pre-amplifier. A plurality of amplifiers may be provided, each with its own set of pre-amplifiers, and a selection among the several amplifiers may be made in a similar manner.

Other objects and advantages of the present invention will become apparent from a consideration of the following specification and claims, taken together with the accompanying drawings.

Figure 1:
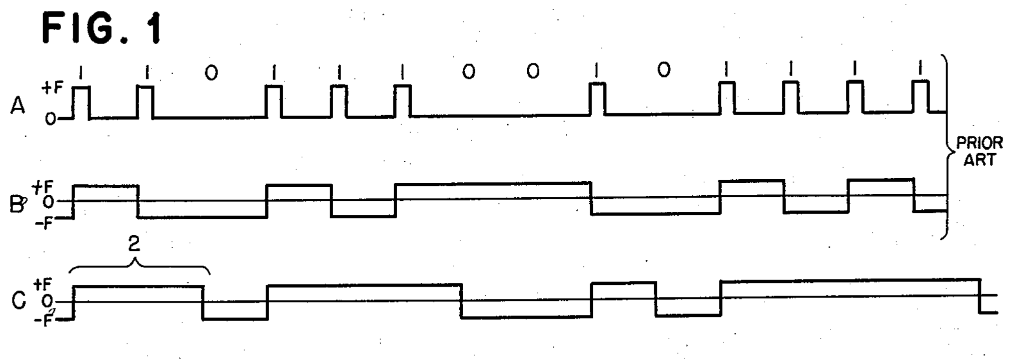
Fig. 1 is a graphical comparison of the binary data handling system of the present invention with the binary data handling systems of the prior art.

*Figure 1*

The line A in this figure is a graphical representation of the discrete pulse system for representing the row of binary quantities appearing at the top of the figure. The line A is illustrated as having a no-signal value of "0," and a signal value of +F. At each of the spaced synchronizing intervals at which a binary "1" is to be indicated, the line A shifts from "0" to +F and then back again, producing a square half-wave having a positive going leading edge and a negative going trailing edge. Note that the half-wave does not take up the entire period of the synchronizing frequency but returns to "0" between successive synchronizing intervals. When a binary "0" is to be indicated, the line A remains at "0" throughout the synchronizing interval associated with the binary "0."

The line B illustrates the non-return to zero (NRZI) system of magnetically recording binary data. It may be seen that the line B shifts between a negative polarity value of −F and a positive polarity value of +F. It never stops at zero or any intermediate value. To indicate a binary "1," the line shifts from −F to +F or from +F to −F. To indicate a binary "0," the line stays constant at −F or at +F, depending upon which value it happens to have at the beginning of the synchronizing period during which the binary "0" is to be indicated. This system has an advantage over the discrete pulse system for the magnetic recording of binary data, since the spatial density of the magnetic bits or poles which are required to be separated in space on the magnetic recording surface is only one-half as great as in the discrete pulse system. The data can therefore be more closely packed on a given surface, increasing the storage capacity of that surface.

The line C illustrates the recording or handling of binary data according to the bipolar system of the present invention. In this system, a binary "1" is indicated by a value of +F on the line C, and a binary "0" is indicated by a value of −F on the line C. If the line is at −F and it is desired to indicate a binary "1" at the next synchronizing interval, the line shifts to +F at the beginning of that interval. It then remains at +F throughout the rest of that period of synchronizing frequency, and through all succeeding periods in which binary "1's" are to be indicated, returning to −F only at the beginning of a synchronizing interval during which a binary "0" is to be indicated. Inasmuch as the line C never returns to "0," the bipolar system is also a non-return to zero system, and is to that extent similar to the system illustrated in line B.

Comparing the bipolar system of line C with the non-return to zero system of line B, it may be seen that the most difficult condition for the recording of magnetic bits in the bipolar system is encountered when the bits being recorded have the successive value 10101010. . . . On the other hand, the most difficult condition for the system of line B to record is encountered in a continuous series of 1's, i.e. 111111111111. . . . The appearance of the lines B and C for these respective most difficult cases would be identical, alternating between −F and +F at successive synchronizing intervals.

It has been determined by statistical analysis of typical binary data that on the average, when the bipolar system of line C is used, there will be two bits of information for each distinct magnetized spot. In other words, the magnetized spot indicated at the interval 2 in line C represents a spot of average size. If the synchronizing interval frequency (sometimes called the basic "bit" frequency) is 240 kilocycles, as it is in one machine constructed in accordance with the present invention, then the maximum possible spot frequency encountered when using the bipolar system of line C (representing the most difficult condition as defined above), is 120 kilocycles and the average spot frequency is 60 kilocycles.

In order to make the best use of available space on the storage surface, it is preferred to select the speed of movement of the storage surface past the writing coil so that the effect of "fringing," or distortion between spots, just begins to appear at the average spot frequency, in the instant example, 60 kilocycles. This produces some loss in the signal pulse amplitude at the highest possible frequency, 120 kilocycles, but this loss is compensated in the reading amplifier, described hereinafter and illustrated in Fig. 4. Furthermore, patterns of a lower spot frequency produce wave forms at the reading head which are readily interpreted correctly by that reading amplifier.

Figure 2:
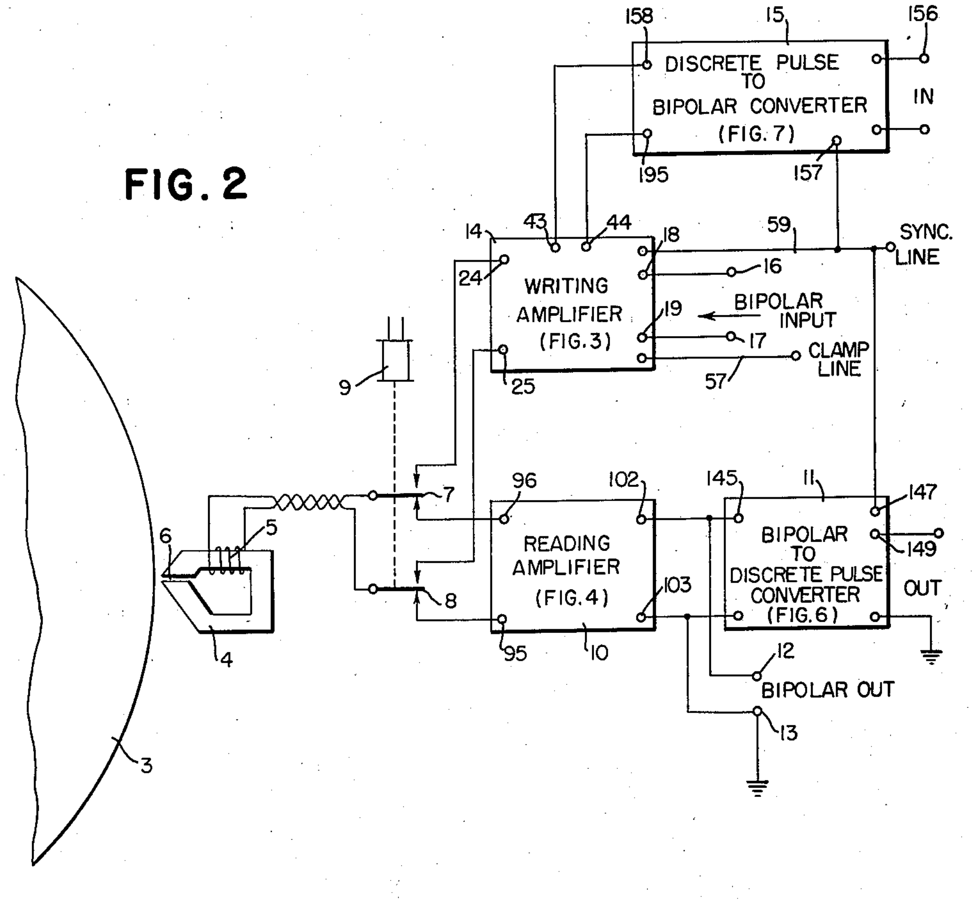
Fig. 2 is a somewhat schematic wiring diagram showing a binary data storage system constructed in accordance with the present invention.

*Figure 2*

This figure illustrates schematically apparatus for writing data on or reading data from one storage track of a multiple track drum 3. A track selection system for such a drum is described below in connection with Fig. 9. The drum 3 may be brass with a storage surface of magnetic material plated on its periphery. Writing on the drum 3 and the reading of data therefrom are both accomplished through the same write-read head 4, which includes a coil 5 and a magnetic circuit including an air gap 6 past which the surface of the drum 3 moves. The terminals of the coil 5 are connected through a twisted pair to the moving contacts 7 and 8 of a read-write selector relay 9, whose energization may be controlled by any suitable circuit. When relay 9 is de-energized, the moving contacts 7 and 8 rest on their back contacts and connect the coil 5 to a reading amplifier 10, shown in detail in Fig. 4. The output terminals of the reading amplifier 10 may be connected either to a converter 11 which changes the bipolar pulses to discrete pulses, or they may be connected to direct output terminals 12 and 13, and thereby to suitable apparatus for handling bipolar pulses. An example of such suitable apparatus is the shifting register shown and claimed in my copending application Serial No. 469,895, filed November 19, 1954.

Figure 3:
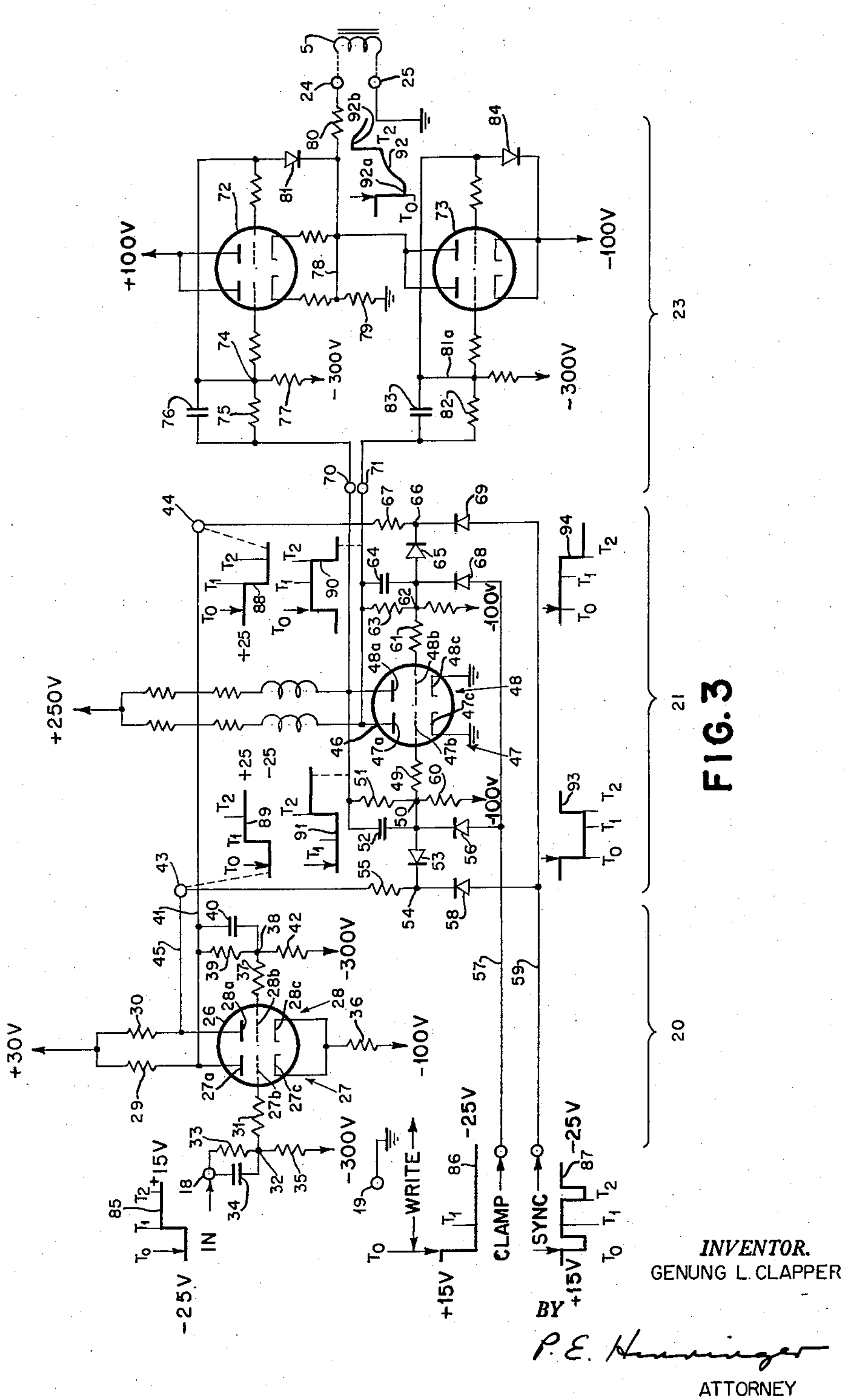
Fig. 3 is an electrical wiring diagram of a writing amplifier used in the system of Fig. 2.

When relay 9 is energized, the contacts 7 and 8 engage front contacts which connect the coil 5 to a writing amplifier 14, shown in detail in Fig. 3 and having one set of input terminals 43 and 44 which may be connected to a converter for changing discrete pulse data into the bipolar system, and another set of input terminals 18 and 19 which may be connected to direct bipolar input terminals 16 and 17. These bipolar input terminals may be connected to any suitable circuit or device for producing bipolar binary pulses, for example the shifting register referred to above.

The converters 11 and 15 and the writing amplifier 14 also have terminals connected to a synchronizing line 59, and the writing amplifier 14 has another terminal connected to a clamp line 57.

*Figure 3*

This figure is a wiring diagram of the writing amplifier illustrated schematically at 14 in Fig. 2. The writing amplifier has input terminals 18 and 19, and includes a dual inverter stage 20, a trigger 21 and a push-pull driving stage 23 connected to output terminals 24 and 25. Input terminal 19 is grounded, and input terminal 18 is connected to a source of binary bipolar signals, which may, for example, follow the signal pattern of line C in Fig. 1. Output terminal 25 is grounded and the coil 5 of the writing head 4 is connected to the output terminals 24 and 25.

The dual inverter stage 20 comprises a twin triode 26, one triode 27 of which includes an anode **27*a*, a control electrode 27*b* and a cathode 27*c*, and the other triode 28 comprises an anode 28*a*, a control electrode 28*b* and a cathode 28*c*. The anodes 27*a* and 28*a* are connected through resistors 29 and 30**, respectively, to the positive terminal of a battery (not shown), whose negative terminal is grounded and which is indicated by way of example as having a terminal potential of 30 volts.

In order to simplify the drawings, many of the sources of energy employed have been omitted. At each point in the drawing where such an omission is made, the battery or other potential source is indicated by a legend on the drawing, with a polarity and potential indicated as representing that of the particular terminal of the source to which the point in question is connected. In each instance it is intended that the opposite terminal of the battery or other source of energy is grounded.

Control electrode **27*b* is connected through a resistor 31 to a junction 32. Junction 32 is coupled through a resistor 33 and a parallel capacitor 34 to input terminal 18. Junction 32 is also coupled through a resistor 35 to the negative terminal of a source of biasing potential of 300 volts. The cathodes 27*c* and 28*c* are connected through a resistor 36 to the negative terminal of a source of bias potential of 100 volts. Control electrode 28*b* is connected through a resistor 37, to a junction 38. Junction 38 is coupled through a resistor 39 and a parallel capacitor 40 to a wire 41 connected to the anode 27*a*. Junction 38 is also coupled through a resistor 42** to the negative terminal of a source of bias potential of 300 volts.

The trigger 21 has input terminal 43 and 44. Terminal 44 is connected through wire 41 to anode **27*a* of the dual inverter stage 20. Terminal 43 is connected through a wire 45 to anode 28*a* of the dual inverter stage 20. The trigger 21 includes a twin triode 46, one triode 47 comprising an anode 47*a*, a control electrode 47*b* and a cathode 47*c*, and the other triode 48 comprising an anode 48*a*, a control electrode 48*b* and a cathode 48*c***.

The anodes **47*a* and 48*a* are connected through suitable load circuits, each shown as including a choke coil and two resistors in series, to the positive terminal of a source of load supply potential of 250 volts. Control electrode 47*b* is connected through a resistor 49 to a junction 50. Junction 50 is coupled through a resistor 51 and a parallel capacitor 52 to the anode 48*a*. Junction 50 is also coupled through a diode 53 to a junction 54 which is in turn coupled through a resistor 55 to input terminal 43. Junction 50 is coupled through a diode 56 to clamp line 57, and junction 54 is coupled through a diode 58 to synchronizing line 59. Juntion 50 is coupled through a resistor 60** to the negative terminal of a source of biasing potential of 100 volts.

Control electrode **48*b* is connected through a resistor 61 to a junction 62, which is coupled through a resistor 63 and a parallel capacitor 64 to the anode 47*a*. Junction 62 is also coupled through a diode 65 to a junction 66, which is in turn coupled through a resistor 67 to the input terminal 44. Junction 62 is coupled to clamp line 57 through a diode 68, and is connected through a resistor to the negative terminal of a source of biasing potential of 100 volts. Junction 66 is coupled to synchronizing line 59 through a diode 69. The trigger 21 has output terminals 70 and 71, respectively connected to the anodes 48*a* and 47*a***.

The push-pull driving stage 23 comprises a twin triode 72, whose two triodes are connected in parallel as a cathode follower, and a twin triode 73, whose two triodes are connected in parallel as a plate driver.

The two control electrodes of the twin triode 72 are connected through respective protective resistors to a junction 74, which is coupled through a resistor 75 and a parallel capacitor 76 to the input terminal 70. Junction 74 is also coupled through a resistor 77 to the negative terminal of a source of biasing potential of 300 volts.

The two anodes of the twin triodes 72 are connected to the positive terminal of a plate voltage supply, indicated as being 100 volts. The two cathodes of the twin triodes 72 are connected through respective resistors to a common junction 78. Junction 78 is connected through a resistor 79 to ground and through a resistor 80 to output terminal 24. A diode 81 connects junction 74 with junction 78.

The two anodes of the twin triode 73 are connected to junction 78. The two control electrodes of twin triode 73 are connected through respective protective resistors to a common junction **81*a*, which is coupled through a resistor 82 and a parallel capacitor 83 to input terminal 71. Junction 81*a* is also connected through a resistor to a source of bias potential at −300 volts. The cathodes of triode 73** are connected to a source of biasing potential at −100 volts. A diode 84 connects common junction 81a with the cathodes of triode 73.

The clamp line 57 is connected to a suitable clamp potential generator which is shiftable between a clamping potential of +15 volts and an operating potential of −25 volts. The synchronizing line 59 is connected to a suitable source of synchronizing pulses. This may be a synchronizing pulse generator controlled by magnetic spots recorded on a timing track on the drum 3, amplified and squared to provide discrete synchronizing pulses shifted between a no-signal potential of +15 volts and a signal potential of −25 volts. Suitable clamping potential and synchronizing generators are illustrated in my copending application, Serial No. 469,895, filed November 19, 1954, previously mentioned.

*Operation of Fig. 3*

The potential of input terminal 18 varies between a binary "0" value of −25 volts and a binary "1" value of +15 volts. The operation of the writing amplifier will be described through an interval in which the input potential varies as indicated by the graphical line 85 in Fig. 3, starting at a time $T_0$ at the beginning of a synchronizing interval, when the input potential is −25 volts and continuing through a time $T_1$, at which the input potential shifts from −25 volts to +15 volts, and the next synchronizing interval which begins at a time $T_2$. As illustrated by the graphical line 86, it is assumed that the clamping potential is at its clamping value of +15 volts preceding the time $T_0$ and that it then shifts to its operating potential of −25 volts, retaining that value throughout the subsequent operation described. As shown by the graphical line 87, the synchronizing potential begins a synchronizing pulse at the time $T_0$, and has completed that pulse before the time $T_1$. A second synchronizing pulse begins at time $T_2$.

The triode 27 of the dual inverter stage inverts the input signal, and impresses it on the input terminal 44 of trigger 21, where it appears as shown by the line 88. That same inverted potential is transmitted through resistor 39 and capacitor 40 to the control electrode of triode 28, which again inverts the signal, so that the potential at the anode of triode 28 is substantially the same in form as the potential at input terminal 18. That potential, shown by the line 89, is transmitted to input terminal 43 of trigger 21.

When the trigger 21 is clamped, as it is during the period preceding the time $T_0$, both the control electrodes of the twin triode 46 are positively biased by the clamping potential transmitted through the diodes 56 and 68, so that both triodes 47 and 48 are in a substantially conductive condition. The diodes 53 and 65 are poled to prevent any negative potential at input terminals 43 and 44 affecting the conductivity of the triodes, as long as clamp line 57 remains at +15 volts. The anode potentials of triodes 47 and 48 are shown respectively by the graphical lines 90 and 91. These output or anode potentials are then (before $T_0$) at the lower of their two operating values, and these lower values are transmitted through output terminals 70 and 71 to the inputs of the driving stage 23, so that both the cathode follower 72 and the plate driver 73 are cut off, and no current flows in the coil 5.

At the time $T_0$, the potential of clamp line 57 is shifted from its clamping value of +15 volts to its operating value of −25 volts. The positive bias on the control electrodes of the twin triode 46 is then removed, and one of the twin triodes 46 cuts off, depending upon the potentials at the input terminals 43 and 44. At the same time, the negative going synchronizing pulse appears on the synchronizing line 59. Since input terminal 43 is now at its more negative value of −25 volts, there is no reverse biasing potential across diode 58, and none across diode 53.

Current flows from the anode 48a which is at this time about +60 volts potential through resistor 51, diode 53 and resistor 55 to anode 28a, which is now about −25 volts. This current flow swings the control electrode 47b negative (see line 93), cutting off triode 47. Anode 47a swings positively, as shown by the line 90. This positive swing of anode 47a is transmitted through capacitor 64 and resistor 63 to control electrode 48b (see line 94), maintaining triode 48 conductive. The signal at input terminal 44 is positive at this time, and reversely biases the diode 69 so that the synchronizing pulse can not swing the control electrode 48b negative.

A positive output signal is produced at output terminal 71, as shown by line 90, while output terminal 70 remains negative, as shown by the line 91. Cathode follower 72 remains cut off, while the plate driver 73 begins to conduct, causing current to flow from ground through the coil 5 and thence through the anodes and cathodes of the plate driver 73 to the −100 volt supply. The diode 84 acts as a clamp to prevent the grids of the twin triode 73 from going positive with respect to the cathodes. This limits the maximum current through the coil 5, and produces a flat top to the output current wave form (see line 130, Fig. 5). The output voltage wave form is shown by the line 92 in Fig. 3. The current in the coil 5 flows in a direction to produce negative magnetization to write a binary "0." It will be understood that the voltage across coil 5 falls off after its initial peak. The initial voltage peak produces the current required to establish the magnetic field in the coil. After the magnetic field is established, the impedance of the coil decreases and the voltage falls off, but the strength of the magnetic field remains substantially constant, as does the current in the coil.

When the negative synchronizing pulse terminates, the line 59 returns to +15 volts. This has no effect on triode 48, which is already on. It also has no effect on triode 47, since diode 53 blocks any positive going pulse from reaching control electrode 47b. Consequently, the condition of the trigger does not then change.

At the time $T_1$, the input signal changes from a binary "0" value of −25 volts to a binary "1" value of +15 volts. The signals appearing at the input terminals 43 and 44 of trigger 21 are then reversed. The positive swing at input terminal 43 is blocked from control electrode 47b by diode 53. The negative swing at input terminal 44 is effectively blocked from control electrode 48b by the clamping action of diode 69, since the synchronizing line 59 is now at +15 volts and junction 66 is clamped at that potential. The input terminal changes at time $T_1$ are therefore ineffective to switch the trigger. When the next synchronizing pulse appears at time $T_2$, the clamping action through diode 69 disappears, whereupon a current flow takes place from anode 47a through resistor 63 and capacitor 64, and thence through diode 65 and resistor 67 to input terminal 44. This current flow swings the control electrode 48b negative, cutting off triode 48, raising its plate potential as indicated at time $T_2$ in line 91. This positive swing is transmitted through resistor 51 and capacitor 52 to the control electrode of triode 47, which is thereby turned on. A positive signal is thereby sent through output terminal 70 to cathode follower 72 and a negative signal through output terminal 71, cutting off plate driver 73. Cathode follower 72 comes on, and current flows from the +100 volt supply through the twin triode 72, and thence through resistor 80 and coil 5 to ground. The polarity of the current in coil 5 is then opposite to its previous value, and produces a positive magnetization writing a binary "1." Diode 81 is effective to limit the grid voltage of cathode follower 72 to that voltage appearing on line 73. When current has been established in the coil, the impedance of the coil decreases and the voltage across the coil "slumps." Diode 81 is then effective to bring the grid voltage down, so that the current in the coil remains constant as the voltage from grid to cathode is not changed.

The diode 81 also has another important function. When a positive signal is received at terminal 70, with a steep wave front, capacitor 76 discharges rapidly, part of the discharge passing through diode 81. After the steep wave front passes, the current flow through diode 81 falls off rapidly, but the diode, in accordance with the well-known characteristics of such devices, retains a low back resistance to the flow of current for a very short time, i.e., of the order of 0.5 microsecond. During this short interval, the potential of junction 78 is increasing rapidly as the current flow through coil 5 builds up the potential drop across it in accordance with the well-known "rapid transient" effect encountered when a current flow is initiated through an inductance. This rise in potential is coupled to the control electrodes through the momentarily low back resistance of diode 81 and is effective to ensure that the rise of the current flow in the coil is not adversely affected by the "rapid transient."

As long as the state of the input signal at terminal 18 remains unchanged, the magnetic field in the coil 5 will be constant. A change at the input terminal 18 results in a change in the writing current initiated by the next synchronization pulse which appears after that input change. The changes in the writing current occur only at the times determined by the synchronization pulses. Since the changes always occur at synchronous times determined by a synchronizing track fixed on the drum surface, and the condition of magnetization is maintained continuously between those times, then if the coil is energized strongly enough to establish a condition of magnetic saturation in the track, regardless of its previous magnetic condition, it is possible to write a new set of data without erasing the previously written data or otherwise restoring the drum surface either to a negative magnetization condition or to a neutral state. Furthermore, it is possible to edit the original data by proper timing of the writing clamp signal.

Each input to the trigger stage 21 may be considered as a negative coincidence circuit. In other words, each of the control electrodes **47*b* and 48*b* is connected to three input terminals, namely one of the signal input terminals 43 and 44, the clamp line 57 and the synchronizing line 59. In order to swing either of the control electrodes 47*b* or 48*b* negative from the positive value provided in each case by the cross-coupling to the opposite anode, then all three of those input terminals must be negative at the same time. This is true of the control electrode 47*b* in the sequence of operation described above at the time $T_0$. At that time, input terminal 44 is positive, so that control electrode 48*b* remains positive. At time $T_1$, control electrode 44 goes negative, but the synchronizing line 59 is then positive. At time $T_2$, the synchronizing line goes negative so that control electrode 48*b* then swings negative and the trigger trips. The trigger is tripped only when one of the control electrodes 48*b*** is swung in a negative sense.

When the write amplifier is being used to write a complete new set of data on its associated track on the drum 3, it does not greatly matter at what instant the clamp line 57 is shifted from its clamping potential of +15 volts to its operating or writing potential of −25 volts, as long as that shift takes place before the data to be written appears at input terminal 18. Also, under those conditions, it does not greatly matter at what instant the clamp line 57 returns from its operating potential to its clamping potential. On the other hand, when the write amplifier is being used to edit the matter previously written on the drum, it is desired to insert a series of binary bits of information in a certain portion of the drum surface, without disturbing the bits in other portions of the storage track. Under those conditions, it is desirable to time the release of the clamp potential and the restoration of the clamp potential at the end of the edit so that those shifts in the clamp potential occur simultaneously with the beginning of the synchronizing pulses marking the beginning and the end of the writing period. If that synchronous relationship of the clamping potential and the synchronizing pulses is observed, then the preceding and following data are not disturbed by the change in the magnetic field of the coil 5 which accompanies the release and application of the clamping potential.

The timing of the releasing and restoration of the clamping potential need not be so strictly held if the input signal during the release or clamping is the same as the previously written bit on the drum storage track. That is to say, if the input signal is, for example, at the binary "0" value and the previously written magnetic field on the drum storage track is at the binary "0" value, then the release of the clamping potential at any time while those values are the same will not create any disturbance of the magnetic field on the storage track.

Bits are commonly written in groups, which are referred to as "words" whether the data in question is alphabetic or numerical. The words are commonly spaced by a series of several synchronizing pulses during which the binary value remains at "0." These spaces between the words are convenient for editing purposes, since they provide intervals of substantial duration during which the clamp potential may be released and clamped without disturbing the previously written data and without the necessity for close synchronization with the synchronizing pulses.

Figure 4:
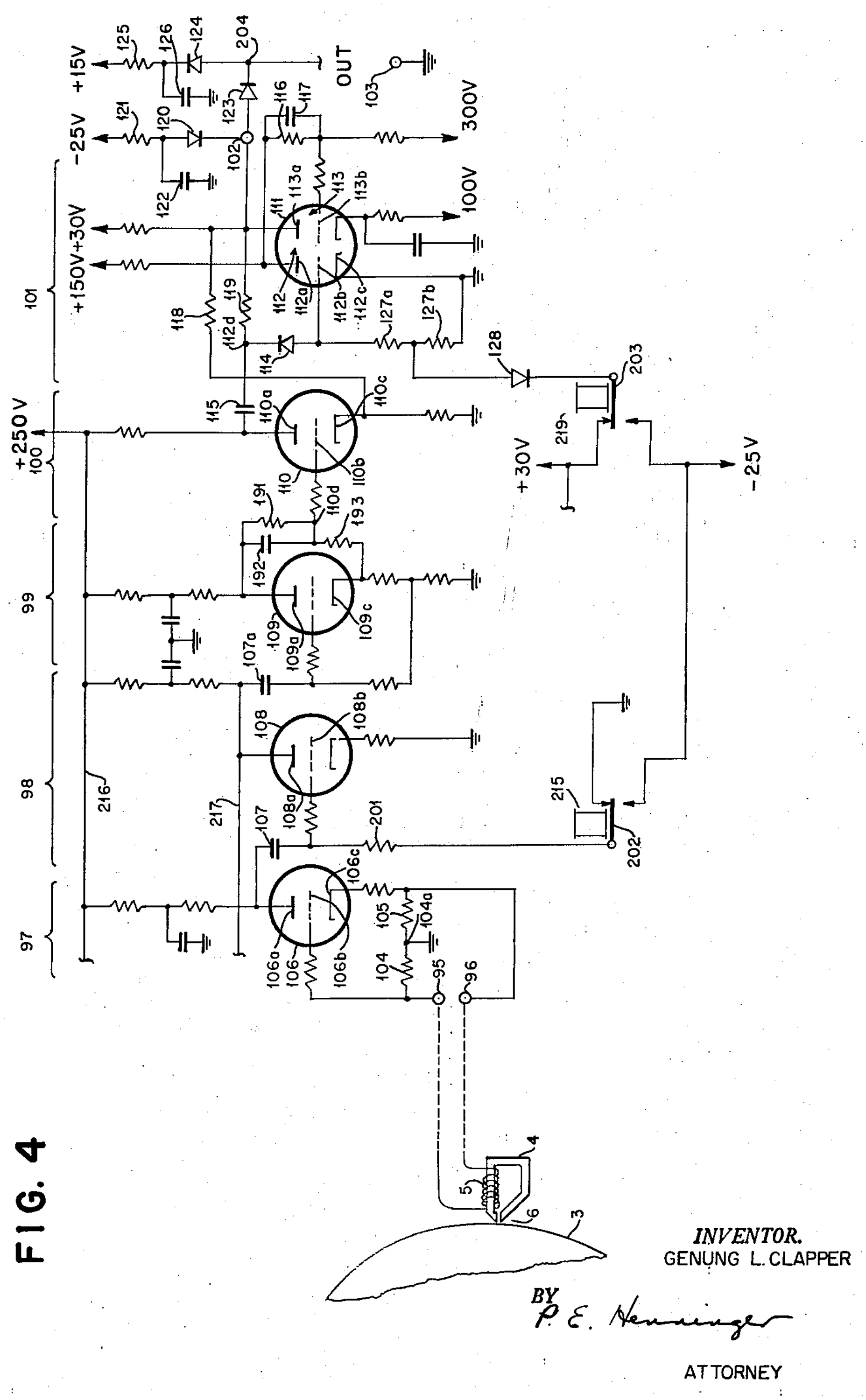
Fig. 4 is a wiring diagram of a reading amplifier used in the system of Fig. 2.

*Figure 4*

This figure illustrates a reading amplifier for reading the data magnetically stored on the drum 3 and translating it into a series of bipolar non-return to zero signals. As shown in Fig. 4, this circuit includes input terminals 95 and 96 connected to a pre-amplifier stage 97, a second pre-amplifier stage 98, a quadrature amplifier stage 99, an intermediate amplifier stage 100, and a trigger stage 101, having output terminals 102 and 103.

The input terminals 95 and 96 are connected across two resistors 104 and 105 in series, having a common grounded terminal **104*a*. This arrangement has proven very satisfactory in eliminating noise from the magnetic pick-up coil 5. The pre-amplifier stage 97 includes a triode 106, having an anode 106*a*, a control electrode 106*b* and a cathode 106*c*. Control electrode 106*b* is connected to input terminal 95, and cathode 106*c* is connected to input terminal 96. The terminal of coil 5 which is grounded when connected to the writing amplifier 14 is connected to terminal 95 and the control electrode 106*b* when using the reading amplifier 10, in order to secure the correct phasing of the output signal from the reading amplifier 10**.

A change in potential at anode **106*a* is transmitted through a coupling capacitor 107 to the control electrode 108*b* of a triode 108 in the second pre-amplifier stage 98. Triode 108 has an anode 108*a* whose potential change is transmitted through a coupling capacitor 107*a* to the input of quadrature amplifier stage 99**.

Control electrode **108*b* is connected through a resistor 201 to a relay contact 202 shown engaging a front contact connected to ground. Alternatively, contact 202 may engage a back contact connected to a source of clamping bias potential of −25 volts. The contact 202 is part of a storage track selection system described below in connection with Fig. 9. As far as the present discussion is concerned, it may be considered that contact 202** is grounded, as illustrated.

The quadrature amplifier stage 99 includes a triode 109 having an anode **109*a* and a cathode 109*c*. Intermediate amplifier 100 includes a triode 110 having an anode 110*a*, a control electrode 110*b* and a cathode 110*c*. Control electrode 110*b* is connected through a protective resistor to a junction 110*d*. Anode 109*a*** of stage 99 is coupled through a resistor 191 and a capacitor 192 to junction 110*d*. Cathode 109*c* of amplifier stage 99 is coupled through a resistor 193 to junction 110*d*.

The trigger stage 101 includes a twin triode 111 comprising a triode 112 and triode 113. The triode 112 has a control electrode 112*b* which is coupled through a diode 114 to a junction 112*d* and thence through a capacitor 115 to the anode 110*a* of triode 110.

The anode 112*a* of triode 112 is coupled through a resistor 116 and a parallel capacitor 117 to the control electrode 113*b* of triode 113. The anode 113*a* of triode 113 is connected to the main output terminal 102 of the reading amplifier.

A first feedback connection, hereinafter identified as the high frequency feedback, extends from anode 113*a* through a resistor 118 to the cathode 110*c* of intermediate amplifier stage 100. Another feedback connection, hereinafter referred to as the low frequency feedback, extends from anode 113*a* through a resistor 119 to junction 112*d*.

Figure 5:
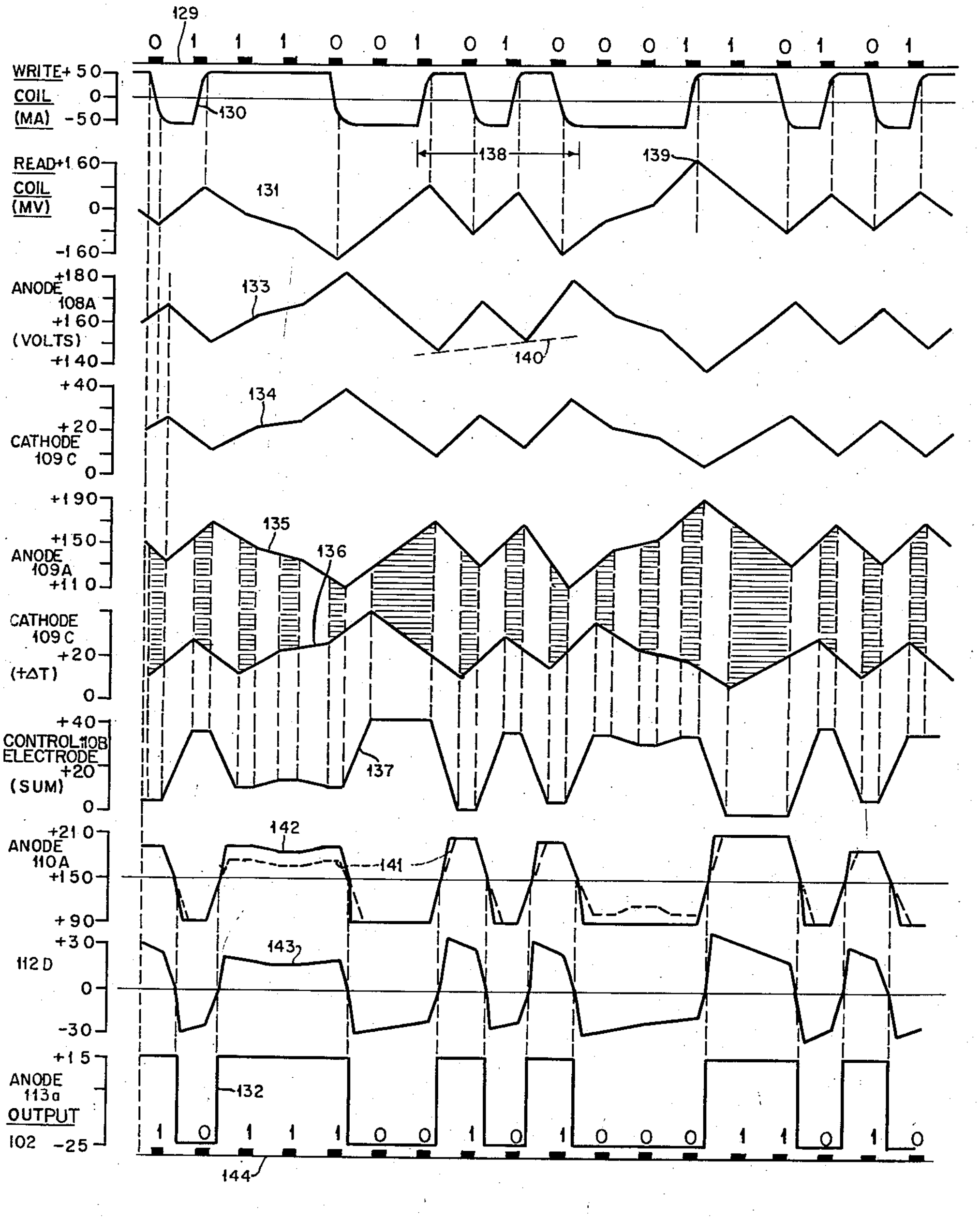
Fig. 5 is a graphical illustration of wave forms occurring at various points in the reading amplifier of Fig. 4.

An explanation of the terms "high frequency" and "low frequency" as applied to the two feedback connections appears to be in order. These terms have reference to the end results of these feedbacks upon the junction 112*d*. Considering the high frequency feedback, note that it acts directly on the cathode 110*c*, so that a change in potential at anode 113*a* results in a change in potential of cathode 110*c*. Resistor 118 has a relatively low impedance (27K ohms) working into a low capacitance element of the triode 110. The potential of cathode 110*c* therefore follows rapidly the changes at anode 113*a*, and the changes at cathode 110*c* cause amplified changes at anode 110*a*. This "high frequency" change in potential is transmitted by capacitor 115 to junction 112*d*. This is indicated in Fig. 5 by the sudden change in the slope of the wave forms 142 and 143 in response to each change in the output wave form 132.

Consider now the "low frequency" feedback. This is a connection from the anode 113*a* through resistor 119 to junction 112*d*. Although resistor 119 has the same resistance as resistor 118 and the connection is seemingly more direct, it is nevertheless slower in its action since resistor 119 in series with the capacitor 115 constitutes a "low pass" for signals appearing at anode 113*a*. The action of this feedback is to establish the D.C. level of junction 112*d* for groups of "0's" or "1's." The low frequency feedback has effectively a much greater capacitance in series with it than does the high frequency feedback. By feeding back through resistor 118, an amplified change is produced at anode 110*a* which is then transmitted through capacitor 115 to junction 112*d*. Capacitor 115 is therefore used for both the input and for the high frequency feedback.

The output terminal 102 is connected to a first clamp circuit including a diode 120, a resistor 121 and a capacitor 122. Resistor 121 is connected to a source of clamping potential of −25 volts, which limits the negative swing of the output terminal potential at that value. Terminal 102 is also connected through a diode 123 to a junction 204, and thence to a second clamping circuit including a diode 124, a resistor 125 and a capacitor 126. Resistor 125 is connected to a source of positive clamping potential indicated as 15 volts, and effective to limit the positive swing of the output potential at that value. Junction 204 is a common output terminal for several amplifiers, as described below in connection with Fig. 9.

Control electrode 112*b* is connected through series resistors 127*a* and 127*b* to cathode 112*c*. The common junction of resistors 127*a* and 127*b* is connected through a diode 128 to a relay contact 203 shown as engaging its front contact, which is connected to a source of bias potential of +30 volts.

Alternatively, contact 203 may engage its back contact, which is connected to a source of bias potential of −25 volts. This contact 203 is part of the storage track selection system described below in connection with Fig. 9. As far as the operation of a single amplifier is concerned, it may be assumed that contact 203 remains in the position shown.

*Operation of Fig. 4—See Fig. 5*

Fig. 5 illustrates graphically the wave forms and potentials encountered at various points in the circuit of Fig. 4.

Line 129 of Fig. 5 illustrates graphically a series of synchronizing pulses, which may be obtained by pickup from a timing track on the drum 3. Above each pulse is indicated a binary value, which indicates the state existing at the writing unit input at that particular synchronizing time. Line 130 shows the current produced in the coil 5 when that series of binary values is converted into bipolar binary signals and transmitted to the writing coil 5 through the writing amplifier 14. The magnetic field intensity along the storage track on drum 3 approximates the wave form shown in line 130. When that magnetic pattern, stored on the storage track, is read by running it past the reading coil 5, the potential induced in the reading coil is a maximum when the rate of change of the magnetic flux on the storage track is a maximum, and tends to fall off to zero when the magnetic field in the storage track holds steady. The wave form of such an induced potential is shown in the line 131 of Fig. 5. In order to read the magnetic pattern on the storage track intelligibly, i.e. so as to produce an electrical signal suitable for use in circuits operating on the bipolar non-return to zero system, it is necessary to convert the potential shown in line 131 in Fig. 5 to a potential approximating that shown in the line 130. The reading amplifier of Fig. 4 performs this function, translating the potential of line 131 to the square wave potential appearing in line 132 near the bottom of Fig. 5.

The first pre-amplifier stage 97 does not invert the signal from the coil 5. Note the connection between the input terminals 95 and 96, including the resistors 104 and 105, and the grounded junction 104*a*. By virtue of this arrangement, the coil 5 supplies to the cathode 106*c* and the control electrode 106*b* two signals of opposite phase. As mentioned above, the terminal 95 is connected to that terminal of coil 5 which is grounded during the operation of the writing amplifier 14. The signal appearing at terminal 96 may therefore be said to be in phase with the written signal, whereas the signal appearing at terminal 95 and applied to control electrode 106*b* is the opposite phase signal. Since the in phase signal is applied to cathode 106*c*, it is not inverted. The out of phase signal being applied to control electrode 106*b* is inverted, and aids the in phase signal in producing amplification at the anode 106*a*.

Noise that is picked up on the input lines which connect the coil 5 to the terminals 95 and 96 appears in phase at both of those terminals and so is effectively canceled by the inversion effect of the control electrode 106*b*.

The second pre-amplifier stage 98 is more conventional, and inverts the applied signal, so that the potential wave form appearing at anode 108*a* is that illustrated by the line 133 in Fig. 5, being an inversion of the line 131, accompanied by a slight phase displacement.

The potential at cathode 109*c* in stage 99 is shown in the curve 134 of Fig. 5, being substantially a reproduction of the line 133, with some decrease in amplitude. (The amplitude in line 134 is about 80% of the amplitude in line 133.) The potential at anode 109*a* is shown at 135 in Fig. 5, the wave form being substantially that of line 131.

The signal supplied to junction 110*d* and control electrode 110*b* is a summation of the potential at anode 109*a* and the potential at cathode 109*c*, or rather it is a summation of a portion of each of those potentials. Since the potential at cathode 109c is connected through a purely resistive coupling to junction 110d, whereas the potential at anode 109a is connected to junction 110d through a parallel resistor and capacitor, the component of the anode potential reaching junction 110d is advanced in phase with respect to the component of the cathode potential. In order to simplify the drawing, the total phase displacement between the two component potentials which add at junction 110d is illustrated by the line 136, which is based on line 134 retarded in phase by a predetermined amount. The summation of these two component potentials signals at junction 110d and control electrode 110b is shown in line 137. It may be seen that during those intervals when the slopes of the lines 135 and 136 are opposite, they add to a substantially constant potential at 110d. These intervals are illustrated by shading on the diagram. During those intervals when the lines 135 and 136 slope in the same direction, there is produced at junction 110d, a potential represented by a steeply sloping line.

During the period indicated at 138 in Fig. 5, signal pulses of opposite polarities appear at maximum frequency. Note that at this frequency, the amplitude of the peaks in the induced potential wave 131 is substantially reduced as compared to the peak amplitude appearing for example at 139. This is the effect of "packing" or "fringing." This effect also produces a tilt, or difference in amplitude of successive peaks, which is illustrated at 140 in line 133.

Note that the effect of the quadrature addition performed at junction 110d is to reduce the difference in amplitude between the interval 138, for example, and the time 139. Furthermore, the tilt is substantially reduced and there is a considerable squaring of the signal potential waves. It has been found that the optimum phase displacement is one-fourth of the period of a median frequency half-way between average frequency (60 kilocycles) and the maximum frequency (120 kilocycles). The median frequency in the present illustrative example is 90 kilocycles and the period of one wave is 11.1 microseconds. The total phase displacement is one-fourth of that time or 2.78 microseconds. To secure this desired relationship in the addition of the two component signals at junction 110d, the resistance R of resistor 191 must be related to the capacitance C of capacitor 192 so that $$R=\frac{1}{2\pi fC}$$

If the capacitance of capacitor 192 is 100 mmfd., and the frequency $f$ is 90 kilocycles, then the above equation becomes $$R=\frac{1}{6.28\times 9.0\times 10^4\times 1.0\times 10^{-10}}=17,700 \text{ ohms}$$

If the selected phase displacement is 90° at 90 kc., then it will be 135° at 120 kc. and 60° at 60 kc. Pulse repetition rates below 60 kc. are handled by the amplifier without any difficulty, since the effect of "fringing" disappears below that frequency.

It has been found that the phase displacement selected may vary as much as 33⅓% in either direction from the optimum of 90° at median frequency, without loss of a satisfactory wave form at the output.

The signal at 110d is amplified and inverted by the stage 100 which is also affected by the high frequency feedback from the output of the trigger stage 101 through resistor 118. The effect of this feedback is to increase the speed of response of the amplifier stage 100, so as to produce a further squaring up of the signal. The dotted line 141 of Fig. 5 shows the wave which would be secured from the output of the intermediate stage 100 if no feedback were employed. The solid line 142 shows the actual output wave obtained with feedback.

The line 143 in Fig. 5 shows the potential wave at the junction 112d in the input of the trigger stage 101. Note that this wave form is substantially evenly distributed above and below ground potential. The triode 112 overdrives the triode 113 but the output potential of triode 113 is limited by the positive and negative clamping circuits. The diode 114 prevents the flow of substantial grid current in the triode 112, during the positive swings of the potential at junction 112d.

The negative halves of the waves in line 143 are reproduced and squared by the stage 101, the overdriving effect producing the completely squared wave shown at 132.

The line 144 in Fig. 5 shows the optimum timing of the synchronization pulses for reading out or sampling the potential of line 132. This synchronization pulse can be generated from the trailing edge of the timing pulse shown in line 129 at the top of Fig. 5. Synchronization of the output in this fashion will delay the output just enough to accommodate the phase shift which was introduced in the quadrature amplifier stage, without introducing error.

Figures 6, 7:
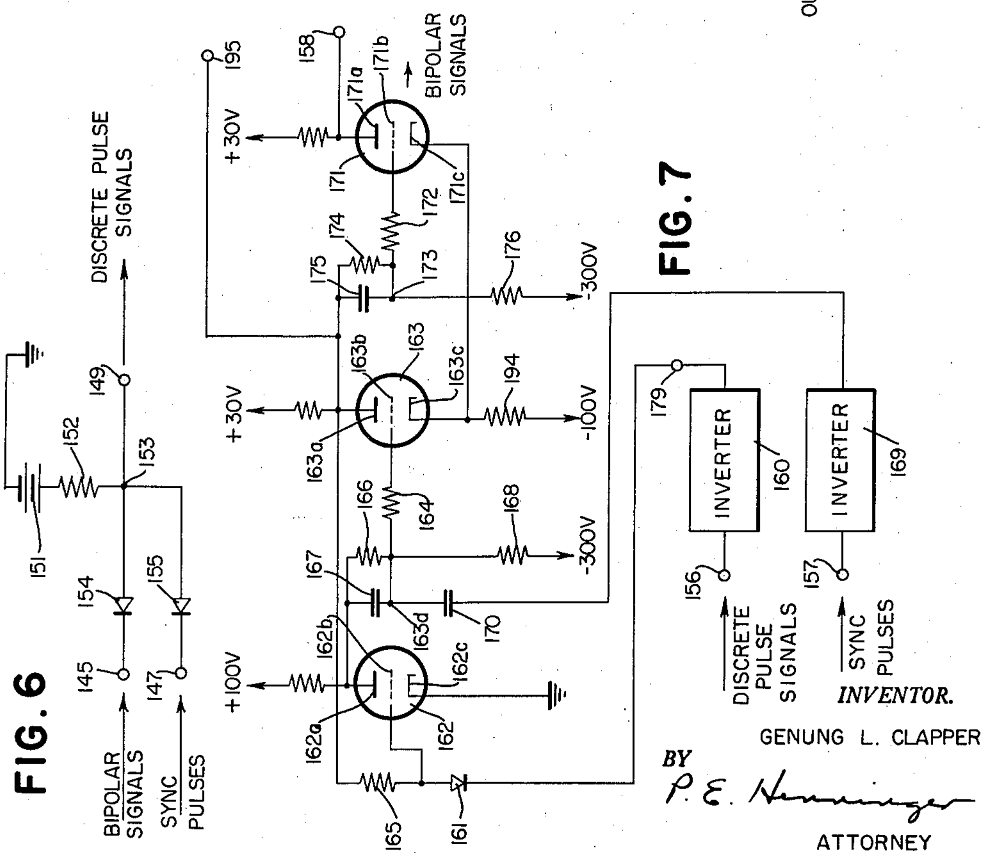
Fig. 6 is a wiring diagram of a circuit for converting bipolar binary data from the circuit of Fig. 2 to the more conventional discrete pulse system.
Fig. 7 is a wiring diagram of a circuit for converting discrete pulse binary data into bipolar data which may be handled by the circuit of Fig. 3.

*Figure 6*

This figure illustrates a simple circuit for converting bipolar signals of the type produced by the reading amplifier 10 of Fig. 4 into the more conventional discrete pulse signals.

Figure 8:
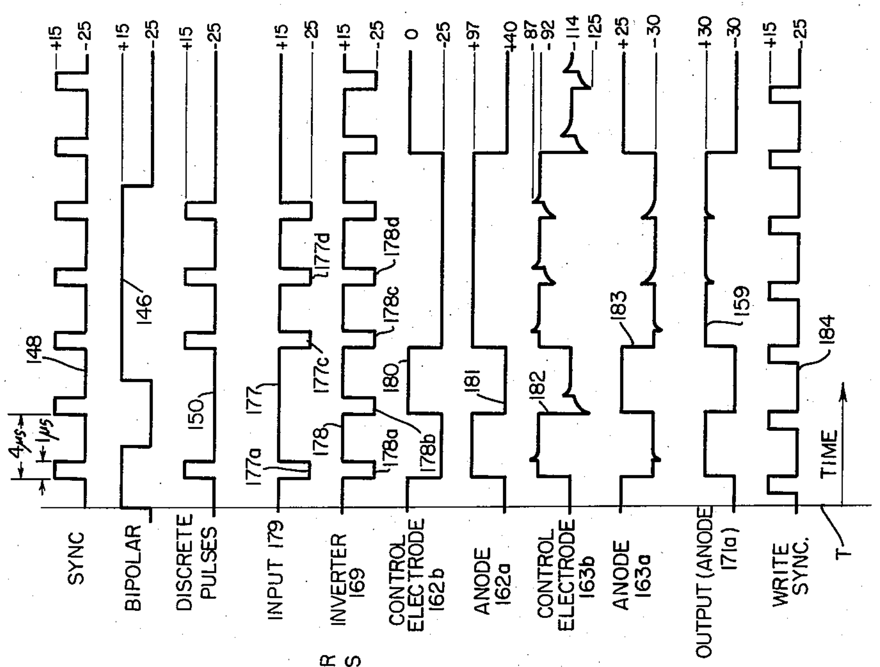
Fig. 8 is a graphical illustration of wave forms occurring at various points in the circuits of Figs. 6 and 7.

The circuit of Fig. 6 is a simple AND circuit. The various wave forms involved are illustrated in Fig. 8. The AND circuit of Fig. 6 includes an input terminal 145, to which bipolar signals shown in line 146 of Fig. 8 are supplied. The circuit of Fig. 6 also includes another input terminal 147 to which are supplied synchronizing pulses shown in line 148 of Fig. 8. The circuit of Fig. 6 produces at an output terminal 149 discrete pulse signals, as shown in line 150 of Fig. 8.

The circuit of Fig. 6 includes a battery 151 and a resistor 152 connected in series to a junction 153. Junction 153 is connected through a diode 154 to input terminal 145 and through a diode 155 to input terminal 147. Junction 153 is connected directly to output terminal 149. As shown in Fig. 8, the bipolar signal 146 shifts between a binary "1" value of +15 volts and a binary "0" value of −25 volts. The synchronizing pulse 148 also shifts between +15 and −25 volts.

When both input terminals 145 and 14 are at +15 volts, then junction 153 is also at +15 volts, since both diodes 154 and 155 are then in their forwardly biased or low impedance conditions. Output terminal 149 is consequently also at +15 volts. When either of the input terminals 145 and 147 is at −25 volts, then its associated diode 154 or 155 is biased forwardly and the junction 153 swings to −25 volts also. The diode connected to the other input terminal is thereby biased reversely, so that the potential at that other input terminal does not affect the potential of junction 153. Output terminal 149 is therefore at −25 volts.

In effect, the synchronizing pulses at input terminal 147 sample the bipolar signals at input terminal 145. When the bipolar signal is at its binary "1" value, a discrete output pulse representing a binary "1" is produced. When the bipolar signal is at its binary "0" value, no output pulse is produced.

*Figure 7*

The circuit of this figure is a converter for translating discrete pulse signals into bipolar signals. It is suitable for use as the converter 15 of Fig. 2. The potentials at various points in the circuit of Fig. 7 are illustrated graphically in Fig. 8. The converter of Fig. 7 has an input terminal 156, to which are supplied discrete pulse signals, which may be the signals shown in line 150 of Fig. 8. The converter of Fig. 7 also includes an input terminal 157, to which are supplied synchronizing pulse signals which may be the signals illustrated in the line 148 of Fig. 8. The converter has an output terminal 158, at which are produced the bipolar output signals shown in the line 159 of Fig. 8.

The input terminal 156 is connected through an inverter 160, which may be any conventional inverter circuit, and a diode 161 to a control electrode 162*b* of a triode 162 which also has an anode 162*a* and a cathode 162*c*. Anode 162*a* is connected through a suitable load resistor to a source of load supply potential of +100 volts. Cathode 162*c* is connected to ground.

Another triode 163 has an anode 163*a*, a control electrode 163*b* connected through a resistor 164 to a junction 163*d*, and a cathode 163*c* connected through a resistor 194 to a source of biasing potential, indicated as —100 volts. Control electrode 162*b* is connected through a resistor 165 to anode 163*a*. Anode 162*a* is connected through a resistor 166 and a parallel capacitor 167 to junction 163*d*. Junction 163*d* is connected through a resistor 168 to a source of biasing potential, indicated as —300 volts. Input terminal 157 is connected through a conventional inverter circuit diagrammatically indicated at 169, and a capacitor 170 to the junction 163*d*. Anode 163*a* is connected through a load resistor to a source of anode supply potential indicated as +30 volts.

A triode 171 has an anode 171*a*, a control electrode 171*b*, and a cathode 171*c*. Anode 171*a* is connected through a load resistor to a source of anode supply potential indicated as +30 volts. Control electrode 171*b* is connected through a protective resistor 172 to a junction 173. Junction 173 is connected through a coupling resistor 174 and a parallel capacitor 175 to anode 163*a*. Junction 173 is also connected through a resistor 176 to a source of biasing potential indicated as —300 volts.

*Operation of Fig. 7*

The operation of the circuit of Fig. 7 will be described beginning with the time T in Fig. 8, and considering that the discrete pulse signals supplied to terminal 156 are those defined by the line 150 in Fig. 8 and the sampling synchronizing pulses supplied to terminal 157 are those defined by the line 148 in Fig. 8. These sampling synchronizing pulses are generated from the trailing edge of the basic timing synchronizing pulses shown in line 184.

The inverter 160 changes the discrete pulse signals from the wave form shown in line 150 to the wave form shown in line 177. The inverter 169 changes the synchronizing pulses from the form shown in line 148 to the form shown in line 178.

At the time T, the terminal 179 at the output of inverter 160 is at a potential of +15 volts, as indicated by the line 177 in Fig. 8. Triode 162 is conducting. Anode 162*a* is at the lower of its two operating potentials, shown in line 181 of Fig. 8 as +40 volts. The potential of junction 163*d* is determined by the voltage divider action of the resistances 166 and 168, connected between +40 volts at anode 162*a* and the negative bias of —300 volts. Resistors 166 and 168 are chosen so that junction 163*d* is at —114 volts, as shown in line 182 of Fig. 8. Triode 163 is thereby cut off, and its anode 163*a* is at +25 volts. This potential produces a current flow through resistor 165, tending to maintain control electrode 162*b* positive. Because of the low grid-to-cathode impedance of triode 162, control electrode 162*b* is only slightly positive (see line 180).

The positive potential of 25 volts at anode 163a (see line 183) is also communicated through resistor 174 to the control electrode 171*b* of triode 171. Control electrode 171*b* is thereby biased positively with respect to cathode 171*c* so that it draws a substantial grid current. Control electrode 171*b* therefore remains about the same level as cathode 171*c*, namely —92 volts which sets the potential of anode 171*a* and output terminal 158 at —30 volts.

Summarizing, with the discrete pulse input at its binary "0" value, triodes 162 and 171 are conducting and triode 163 is cut off. The negative going synchronizing pulses of line 178, applied to junction 163*d*, have no effect on the circuit, since the triode 163 is cut off.

Now consider the effect of the first synchronizing pulse 178*a*, which is shown as occurring simultaneously with the first binary "1" signal at 177*a*. Considerable difference in phase between these signals is permissible, as described in detail below.

The signal input pulse lowers input terminal 179 to —25 volts, and diode 161 becomes biased in the forward direction, lowering the potential of control electrode 162*b* to substantially —25 volts and cutting off the triode 162. The potential of anode 162*a* therefore rises, and this positive going potential is coupled to the junction 163*d* through the capacitor 167. As shown in line 181 of Fig. 8, this positive change in potential is from plus 40 to plus 97 volts, and is therefore effective to override the negative going synchronizing pulse which is somewhat weaker, being a swing from +15 to —25 volts. Control electrode 163*b* is thereby swung above its cut-off potential, and triode 163 begins to conduct. The potential of anode 163*a* then drops, and this negative going pulse is transmitted to the control electrode 171*b*, cutting off the triode 171 so that the anode 171*a* and output terminal 158 rise to +30 volts. When triode 163 is conducting, anode 163*a* is held at —30 volts, which is effective to hold triode 171 cut off. The potential of anode 163*a* is also communicated through resistor 165 to control electrode 162*b*, where it is effective to hold triode 162 cut off.

At the end of the input pulse 177*a* and the synchronizing pulse 178*a*, terminal 179 swings back to +15 volts. However, control electrode 162*b* is held at —25 volts by the negative potential at anode 163*a*. The back resistance of diode 161 and resistor 165 act as a voltage divider, so that control electrode 162*b* is just slightly (about 5 volts) more positive than anode 163*a*, i.e. —25 volts (see line 180). At the end of the input pulse, the circuit is in a stable condition with trode 163 conducting and triodes 162 and 171 strongly cut off. The output terminal 158 is at +30 volts indicating a binary "1."

When the synchronizing pulse 178*b* is received, there is no simultaneous discrete input pulse, and the negative going synchronizing pulse shown in line 178 is supplied to junction 163*d*, where it is effective to cut off the triode 163. Anode 163*a* then rises toward +30 volts, and this increase in potential is effective to turn the triodes 162 and 171 ON again. When triode 162 conducts, anode 162*a* is reduced in potential, reinforcing the effect of the negative synchronizing pulse at junction 163*d*. When triode 171 conducts, the output terminal 158 is swung back to the —30 volts level, indicating binary "0."

When synchronizing pulse 178*c* is received, there is a corresponding discrete input pulse 177*c*, and the triodes 162, 163 and 171 are switched in the same way as previously described for the input pulses 177*a* and 178*a*. At the end of the input pulses 177*c* and 178*c*, triode 163 is conducting and triodes 162 and 171 are cut off. This state of affairs continues through the next synchronizing pulse 178*d* and the concurrent discrete input pulse 177*d*. Overriding of the negative going synchronizing pulse at this time occurs in a somewhat different way from that outlined in connection with the input pulses 177*a* and 178*a*. When synchronizing pulse 178*d* is received, the potential at the anode 162*a* does not change, and the negative going pulse 178*d* is not opposed at junction 163*d*. Triode 163 starts to cut off and the potential at anode 163*a* starts to rise, but control electrode 162*b* can not rise because of the effect of the input pulse clamping control electrode 162*b* at —25 volts. Since the potential at anode 162*a* can not drop to reinforce the synchronizing pulse at junction 163*d*, the excursion of the potential of junction 163*d* and control electrode 163*b* into the cut off region of triode 163 is limited, and only a small "pip"

appears at anode **163*a*. This may appear at the output terminal 158, but is very slight, if in fact it appears there at all. Note that the input signal pulse 177*d* effectively blocks the setting up of the feedback by preventing triode 162 from conducting. At the end of the synchronizing pulse 178*d*, triode 163 is back to full conduction and triode 171 is fully cut off. The output terminal 158** remains at 30 volts until a subsequent synchronizing pulse switches the circuit to its opposite condition.

In the event of a phase delay between the synchronizing pulse and the input pulse, the feedback loop from anode **163*a* to control electrode 162*b* and thence through anode 162*a* to control electrode 163*b*, may be established for a short interval. Even if it is established, when the input pulse arrives at control electrode 162*b*, it gains control immediately and triode 163** is rendered conductive to lock the circuit until the next synchronizing pulse.

Generally speaking, the data input pulse always initiates a binary "1" wave form in line 159 and the synchronizing pulse terminates the binary "1" in the absence of a concurrent discrete input pulse. If the data input and synchronizing pulses are nearly coincident, there will be no effect on the output during a series of binary 1's, because of the difference in phase. If the data input lags considerably behind the synchronizing pulses in phase, gaps may appear in the output wave form. It has been found that good coincidence is obtained between the output and the write synchronizing pulses (line 184) even where the input is shifted three microseconds out of a four microsecond synchronous pulse interval.

The bipolar output signals illustrated in line 159 of Fig. 8 may be obtained from terminal 158 of this figure. If complementary output signals are required, another output terminal 195 may be connected to anode **163*a*. When so arranged, the complementary output terminals 158 and 195 may be connected to the complementary input terminals 43 and 44 of the trigger stage 21 in the writing amplifier circuit 14** illustrated in Fig. 3.

The triodes 162 and 163 of Fig. 7 together constitute a typical trigger circuit, since either triode going ON switches the other one OFF. On the other hand, the triodes 163 and 171 taken together constitute a typical dual inverter circuit having complementary outputs.

The following table shows, by way of example, the particular values of resistance and capacitance and identifying data of the particular tubes which were used in specific circuits constructed in accordance with the present invention. The various diodes employed may be germanium diodes, and may be considered as having substantially no impedance in their forward directions and substantially infinite impedance in their reverse directions. The invention is not to be considered to be limited to these specific values nor to the specific potential values indicated by the legends in the drawing, nor to any of those values.

TABLE I

*Figure 3*

| | |
|---|---|
| Coil **5** | 150 turns |
| Twin triode **26** | Tube type 6211 |
| Resistor **29** | 5.6K ohms |
| Resistor **30** | 5.6K ohms |
| Resistor **31** | 10K ohms |
| Resistor **33** | 82K ohms |
| Capacitor **34** | 39 mmfd. |
| Resistor **35** | 200K ohms |
| Resistor **36** | 1.0K ohm |
| Resistor **37** | 10K ohms |
| Resistor **39** | 82K ohms |
| Capacitor **40** | 39 mmfd. |
| Resistor **42** | 200K ohms |
| Twin triode **46** | Tube type 5963 |
| Resistor **49** | 10K ohms |
| Resistor **51** | 150K ohms |
| Capacitor **52** | 10 mmfd. |
| Resistor **55** | 27K ohms |
| Resistor **60** | 100K ohms |
| Resistor **61** | 10K ohms |
| Resistor **63** | 150K ohms |
| Capacitor **64** | 10 mmfd. |
| Resistor **67** | 27K ohms |
| Twin triode **72** | Tube type 5687 |
| Twin triode **73** | Tube type 5687 |
| Resistor **75** | 180K ohms |
| Capacitor **76** | 22 mmfd. |
| Resistor **77** | 620K ohms |
| Resistor **79** | 4.7K ohms |
| Resistor **80** | 47 ohms |
| Resistor **82** | 510K ohms |
| Capacitor **83** | 22 mmfd. |

*Figure 4*

| | |
|---|---|
| Resistor **104** | 1.0K ohm |
| Resistor **105** | 1.0K ohm |
| Triode **106** | Tube type 6211 |
| Capacitor **107** | 470 mmfd. |
| Capacitor **107*a*** | 470 mmfd. |
| Triode **108** | Tube type 6211 |
| Triode **109** | Tube type 5963 |
| Triode **110** | Tube type 5963 |
| Twin triode **111** | Tube type 5963 |
| Capacitor **115** | 270 mmfd. |
| Resistor **116** | 300K ohms |
| Capacitor **117** | 10 mmfd. |
| Resistor **118** | 27K ohms |
| Resistor **119** | 27K ohms |
| Resistor **121** | 200 ohms |
| Capacitor **122** | .01 mfd. |
| Resistor **125** | 47 ohms |
| Capacitor **126** | .047 mfd. |
| Resistor **127*a*** | 20K ohms |
| Resistor **127*b*** | 27K ohms |
| Resistor **191** | 360K ohms |
| Capacitor **192** | 100 mmfd. |
| Resistor **193** | 18K ohms |

*Figure 6*

| | |
|---|---|
| Resistor **152** | 47K ohms |

*Figure 7*

| | |
|---|---|
| Triode **162** | Tube type 6211 |
| Triode **163** | Tube type 6211 |
| Resistor **164** | 10K ohms |
| Resistor **165** | 47K ohms |
| Resistor **166** | 680K ohms |
| Capacitor **167** | 39 mmf. |
| Resistor **168** | 820K ohms |
| Capacitor **170** | 22 mmf. |
| Triode **171** | Tube type 6211 |
| Resistor **172** | 10K ohms |
| Resistor **174** | 300K ohms |
| Capacitor **175** | 39 mmf. |
| Resistor **176** | 620K ohms |
| Resistor **194** | 1K ohm |

Figure 9:
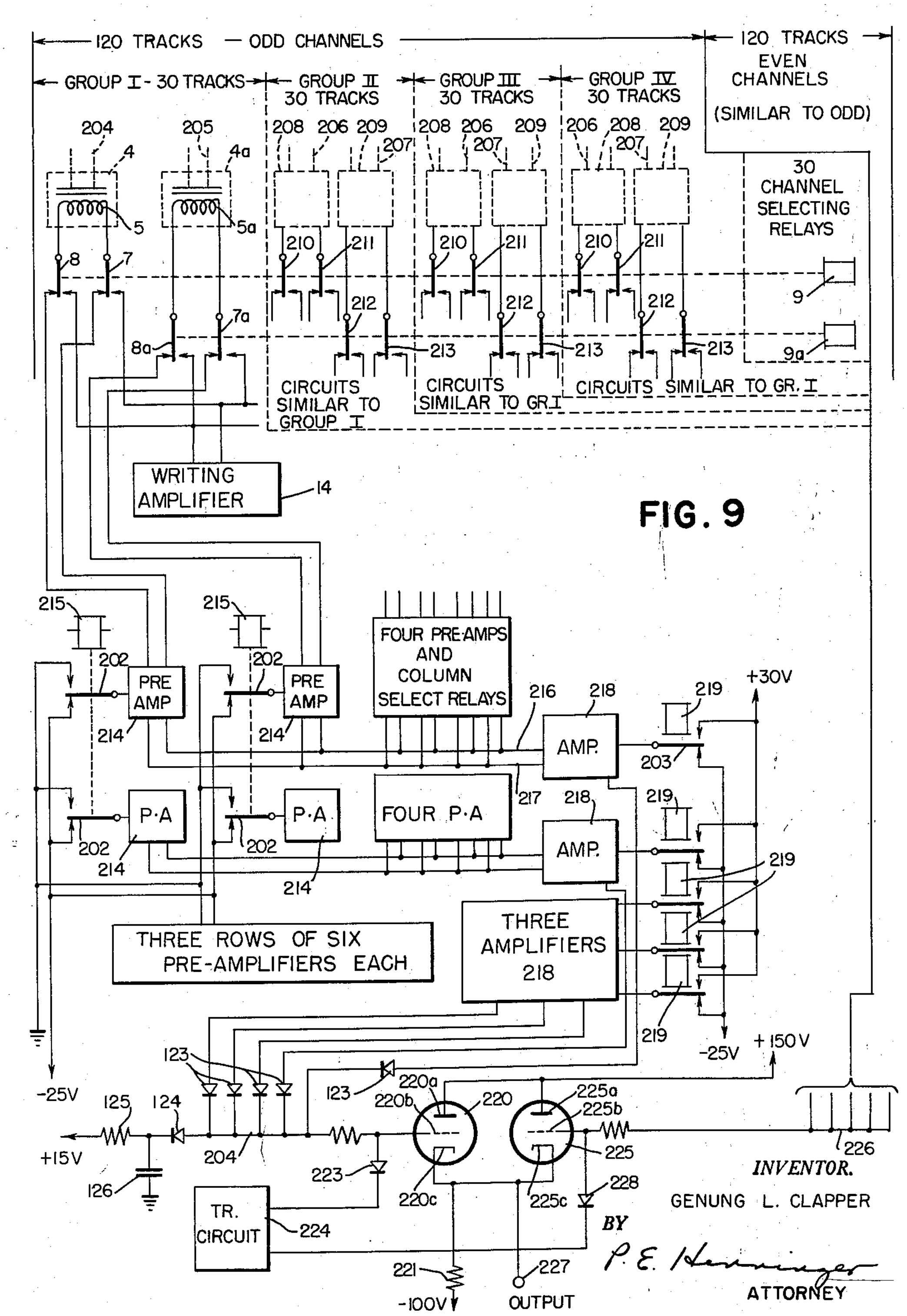
Fig. 9 is a somewhat schematic wiring diagram of a track selection system for a magnetic drum, constructed in accordance with the present invention.

*Figure 9*

This figure illustrates a system for selecting a certain magnetic data storage track or tracks from among a plurality of such tracks on a storage drum, for the purpose of reading data into or out of the selected storage track or tracks. This track selection system is particularly useful in connection with bipolar binary data storage and handling mechanism described in the preceding figures. Many features of the track selection system are, in their broader aspects, also applicable to other types of data storage apparatus.

Fig. 9 illustrates schematically the surface of a data storage drum having 240 storage tracks, divided into two major groups of 120 tracks each, the major groups being respectively referred to as the odd channels and the even channels. Each of these major groups is further subdivided into four smaller groups, identified in the case of the odd channels as groups I, II, III and IV, of 30 tracks each.

In order to simplify the drawing and to avoid unnecessary repetition of duplicate parts, the track selection system is shown in detail only for two tracks of group I in the odd channels. Portions of the track selection system for the other tracks of group I, and portions of the other groups II, III and IV are illustrated sufficiently to show the relationship between the selections in the various groups. None of the even channels is illustrated in detail, except as expressly mentioned below.

Two tracks 204 and 205 of group I cooperate with read-write heads 4 and 4*a* respectively, said heads including coils 5 and 5*a*, respectively. The coil 5 is connected to relay contacts 7 and 8 of a channel selecting relay 9. Similarly, the terminals of coil 5*a* are connected to contacts 7*a* and 8*a* of a channel selecting relay 9*a*. Each of the other three groups of the odd channels is shown as including two tracks 206 and 207, cooperating with read-write heads 208 and 209. The terminals of the coils of the read-write heads 208 are connected to relay contacts 210 and 211 operated by relay 9. The terminals of the coils in the read-write heads 209 are connected to relay contacts 212 and 213 operated by relay 9*a*. In the system illustrated, four tracks, one track from each of the four groups, are read or written simultaneously. These four tracks are spoken of as a channel. There are thus thirty channels in the 120 tracks of the odd channels. When writing on the drum, a particular channel of four tracks is selected by energizing one of thirty channel selecting relays, of which the relays 9 and 9*a* are two. The thirty relays may be energized in sequence by means of a suitable timing circuit which is synchronous with the drum so that each relay is energized for one revolution of the drum. It is therefore possible to fill the drum completely in thirty revolutions.

The channel selecting relays 9 and 9*a* are all normally de-energized, and the coils of the read-write heads are normally connected through the back relay contacts to pre-amplifier circuits, some of which are shown diagrammatically at 214. Each preamplifier 214 comprises two stages, which may be the stages 97 and 98 of Fig. 4. Each of the read-write head coils cooperates with an individual pre-amplifier 214 to which it is connected whenever its particular channel selecting relay is de-energized. There are thus thirty pre-amplifiers in the thirty tracks of group I. They are arranged in the drawing in five rows of six pre-amplifiers each. Only two pre-amplifiers in each of the two rows are shown individually, the others being indicated by boxes with suitable labels in the drawing.

Each pre-amplifier 214 is connected to a relay contact 202 (see Fig. 4), which is operated by a column selecting relay 215. The relays 215 are normally de-energized, in which case the relay contacts 202 are engaging their back contacts, which are connected to a source of bias voltage of −25 volts, which is effective to keep the pre-amplifiers cut off. The pre-amplifiers are turned on, one column at a time, by energizing one of the column selecting relays 215. This operation shifts the relay contacts 202 of that column selecting relay to their front stationary contacts, which are grounded.

All of the six pre-amplifiers of each of the five rows are connected through wires 216 and 217, to a single amplifier 218, which includes the three stages 99, 100 and 101 of Fig. 4. Each amplifier 218 includes a connection to a relay contact 203 (see Fig. 4) operated by a row selecting relay 219. The relays 219 are normally de-energized, with the contacts 203 engaging back contacts connected to a source of biasing potential of −25 volts, which is effective to maintain the respective amplifiers cut off. When a relay 219 is energized, its contact 203 engages a front contact connected to a bias potential of 30 volts, which is effective to render the associated amplifier 218 responsive to incoming signals. The output terminals 102 (see Fig. 4) of the five amplifiers 218 are connected through blocking diodes 123 to a common junction 204 and thence to the control electrode 220*b* of a triode 220 having an anode 220*a* and a cathode 220*c*. The control electrode 220*b* is also connected through a diode 223 to one output of a trigger circuit 224 having complementary outputs.

Another triode 225 has an anode 225*a*, a control electrode 225*b*, and a cathode 225*c*. Its anode and cathode are connected in parallel with the anode 220*a* and cathode 220*c* respectively. Control electrode 225*b* is connected to a common junction 226 which corresponds to the common junction 204, except that it is connected to the five amplifiers for the even channels. The anodes 220*a* and 225*a* are connected to a source of supply potential of 150 volts. The cathodes 220*c* and 225*c* are connected through a resistor 221 to a source of biasing potential of −100 volts. These cathodes are also connected to an output terminal 227. Control electrode 225*b* is also connected through a diode 228 to the complementary output terminal of trigger circuit 224.

The trigger circuit is synchronized with the rotation of the drum, so that triode 220 is active during one rotation of the drum and triode 225 is clamped off. During the next rotation of the drum, triode 225 is active and triode 220 is clamped off. During the drum rotation when triode 220 is clamped off, a track selection is made in group I by energizing one of the column selecting relays 215 and one of the row selecting relays 219. Then at the end of that revolution of the drum, when triode 220 becomes active again, the particular track so selected is immediately ready to start transmitting its recorded data throughout terminal 227. While that track is transmitting its data, the selection of the track to be read during the next revolution is being accomplished in the relays controlling the even channels. Thus, while one track is being read out on one revolution of the drum, a track to succeed it on the next revolution of the drum is being selected among the other major groups of tracks. It is therefore possible to read out all the data stored in the drum in a number of revolutions corresponding to the number of tracks, in the present instance 240. Where the tracks are handled four at a time, as in the specific instance described, all the data on the drum may be read out in sixty revolutions.

The selection of the particular track or tracks to be read out on a given revolution is accomplished by energizing one of the relays 215 and one of the relays 219. Any suitable conventional system for selecting those relays may be employed. For example, if it is desired to read the tracks consecutively until the drum has been completely read out, then the energization of relays 219 may be controlled by a ring circuit so they are energized in sequence, each for a period of twelve revolutions of the drum. The relays 215 will be controlled by a similar ring circuit, but each will be energized only for two revolutions of the drum. Therefore, during the twelve revolutions when relay 219 of the top row is energized, the individual column selecting relays will each be energized for two revolutions, and the tracks associated with the six pre-amplifiers of that row will be read out during alternate ones of those twelve revolutions.

I claim:

1. Data storage apparatus including a storage member having a magnetizable surface with a time track and a storage track, translating coil means adjacent said member and effective when energized to magnetize a portion of said storage track, means for moving the storage member relative to the coil means in a repeated cycle, means for energizing the coil means with current of selectively opposite polarities during such relative movement and thereby effective to magnetize different portions of the storage track with magnetic fields of opposite polarities, said current being of sufficient magnitude to saturate said magnetized portions regardless of their previous magnetic conditions, binary data input means shiftable between a binary "0" condition and a binary "1" condition, synchronizing means for repeatedly checking the condition of said binary data input means at separated intervals of time determined by spaced magnetized zones along said time track, and writing means including said binary input means, said coil energizing means, and said synchronizing means and effective when said binary input means is in one of its binary conditions at one of said intervals to establish in the coil means an electric current of corresponding polarity and to maintain said current flowing until said binary input means is in its opposite binary condition at a succeeding one of said intervals, said writing means being operable during one of said cycles to determine the magnetic data pattern written on said track, regardless of any data remaining on the track at the beginning of said one cycle.

2. Data storage apparatus as defined in claim 1, including means to de-energize said coil means during a portion of a cycle, whereby a selected portion of the data remaining on the track at the beginning of a cycle may remain undisturbed, while another portion of said remaining data is replaced by new data.

3. Data storage apparatus comprising a storage member having a surface magnetizable in adjacent regions with permanent magnetic fields of opposite polarities, translating coil means adjacent said surface, means for relatively moving the coil means and the storage member and effective upon such relative movement to induce in said coil means a potential varying in accordance with the magnetization of said surface, said potential having peak values at times when the boundaries between adjacent regions of opposite polarities are passing said coil means, and means for converting said coil potential into a square wave potential comprising flat peaks of opposite polarities having boundaries corresponding generally in time to the passage of said boundaries of adjacent regions past said coil, said converting means comprising means for producing a composite signal by adding a first component signal corresponding to an inversion of the potential induced in said coil means to a second component signal corresponding directly to said induced potential.

4. Data storage apparatus as defined in claim 3 including means for advancing said second component signal in phase with respect to said induced potential.

5. Data storage apparatus as defined in claim 4, in which said adjacent regions are of equal dimensions in the direction of said relative movement, and said advance in phase is equal to substantially one-quarter of the period of a median frequency between the empirically determined average frequency of passage of boundaries between adjacent regions of opposite polarities and the frequency of passage of boundaries of adjacent regions of whatever polarity.

6. Data storage apparatus as defined in claim 3 including a trigger stage having an input connected to the output of said composite signal producing means, said trigger stage comprising first and second triodes, means including said first triode to overdrive the second triode, and squaring clamps for the output of said second triode.

7. Data storage apparatus as defined in claim 6, including an amplifier stage between the output of the composite signal producing means and the input of the trigger stage, and a high frequency feedback connecting the output of the trigger stage with the input of said amplifier stage.

8. Data storage apparatus as defined in claim 7 including low frequency feedback means connecting the output of the trigger stage with its input.

9. Data storage apparatus as defined in claim 8 in which the first triode of the trigger stage comprises an electric discharge device having an anode, a cathode and a control electrode, means connecting said control electrode to a source of negative bias potential, and means including a diode connected between said amplifier stage output and said control electrode, said diode being poled to prevent said control electrode from swinging beyond a predetermined potential.

10. Data storage apparatus as defined in claim 3, in which said converting means comprises a first amplifier stage for receiving said induced potential from the coil, said first stage comprising an electric discharge device having an anode, a cathode and a control electrode, two substantially equal impedances connected in series between said control electrode and cathode, means connecting the control electrode and cathode respectively to the two terminals of the coil, and means connecting the common junction of said two impedances to ground.

11. Data storage apparatus including a rotary drum having a plurality of data storage tracks on its periphery, a read head for each of said data storage tracks, a main signal output terminal, first amplifier means for a first group of read heads, second amplifier means for a second group of read heads, first and second group output terminals for said first and second groups of read heads, first switching means for selectively connecting one of said first group of read heads to said first group output terminal, second switching means for selectively connecting one of said second group of read heads to said second group output terminal, main switching means synchronous with the rotations of said drum and effective to connect the respective group output terminals to the main signal output terminal on alternate revolutions of the drum, and means for operating said first and second switching means during revolutions when their respective group output terminals are not connected to the main output terminal.

References Cited in the file of this patent

UNITED STATES PATENTS

| | | |
|---|---|---|
| 2,506,770 | Braden | May 9, 1950 |
| 2,560,709 | Woodward | July 17, 1951 |
| 2,605,403 | Crandon | July 29, 1952 |
| 2,620,406 | Nelson | Dec. 2, 1952 |
| 2,674,660 | Ambrose | Apr. 6, 1954 |
| 2,695,992 | Winger | Nov. 30, 1954 |
| 2,704,361 | Pouliart et al. | Mar. 15, 1955 |
| 2,713,676 | Fleming | July 19, 1955 |
| 2,730,577 | Winters | Jan. 10, 1956 |
| 2,773,222 | Chauvin | Dec. 4, 1956 |
| 2,780,670 | Brewster | Feb. 5, 1957 |
| 2,781,479 | Rice | Feb. 12, 1957 |
| 2,784,851 | Bretschneider | Mar. 12, 1957 |
| 2,813,927 | Johnson | Nov. 19, 1957 |
| 2,853,357 | Barber | Sept. 23, 1958 |
| 2,856,256 | Carman et al. | Oct. 14, 1958 |
| 2,861,258 | Walsh et al. | Nov. 18, 1958 |